(12) United States Patent
Takayanagi

(10) Patent No.: US 7,224,388 B2
(45) Date of Patent: May 29, 2007

(54) WIDE DYNAMIC RANGE ACTIVE PIXEL WITH KNEE RESPONSE

(75) Inventor: Isao Takayanagi, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 625 days.

(21) Appl. No.: 10/431,397

(22) Filed: May 8, 2003

(65) Prior Publication Data
US 2004/0223065 A1 Nov. 11, 2004

(51) Int. Cl.
H04N 3/14 (2006.01)
H04N 5/335 (2006.01)

(52) U.S. Cl. .................. 348/297; 348/299; 348/302

(58) Field of Classification Search ........... 348/301, 348/299, 223.1, 291, 292, 294, 300, 307, 348/308, 309, 310, 297, 295; 257/291, 292; 250/208.1
See application file for complete search history.

(56) References Cited

U.S. PATENT DOCUMENTS

| 5,128,534 | A  | * | 7/1992  | Wyles et al. ............. 250/208.1 |
| 6,512,544 | B1 | * | 1/2003  | Merrill et al. ............. 348/302 |
| 6,943,838 | B2 | * | 9/2005  | Fossum et al. ............ 348/311 |
| 2002/0153474 | A1 | * | 10/2002 | Muramatsu et al. ..... 250/208.1 |
| 2003/0067549 | A1 | * | 4/2003  | Ueno ......................... 348/300 |
| 2004/0036784 | A1 | * | 2/2004  | Bock .......................... 348/308 |

OTHER PUBLICATIONS

Ricquier et al., N., "Active Pixel CMOS Image Sensor with On-Chip Non-Uniformity Correction".
Kavadias et al., S., "P8: On-chip offset calibrated logarithmic response image sensor", pp. 68-71.
Sasaki et al., M., "P4 A CMOS Image Sensor Integrating Gamma Correction and Gain Control Functions", pp. 52-55.
Fox et al., E., "Wide-Dynamic-Range Pixel with Combined Linear and Logarithmic Response and Increased Signal Swing".

* cited by examiner

Primary Examiner—Vivek Srivastava
Assistant Examiner—Nelson D. Hernandez
(74) Attorney, Agent, or Firm—Dickstein Shapiro LLP

(57) ABSTRACT

A pixel circuit, and a method for operating a pixel circuit, to provide a multiple knee response characteristic. In one embodiment of the invention, one or more feed-through pulse (FTP) signals are transmitted to an integration node to end a first linear integration time period. The FTP signal allows electrons to drain from the integration node to a reset node through a transfer gate. After the first integration period, a second linear integration period is conducted on the pixel circuit, where the photo conversion gain of the pixel circuit becomes reduced under higher illumination conditions due to the drained node. Such operation creates a pixel with a photo response having multiple "knee" points, where each "knee" in the photo response curve will create separate regions whose photo sensitivities can be independently controlled with minimal thermal interference. By setting different voltage levels for the FTP signal and by controlling the integration time periods, the photo-response of the pixel circuit can be easily controlled.

34 Claims, 15 Drawing Sheets

FIG. 3
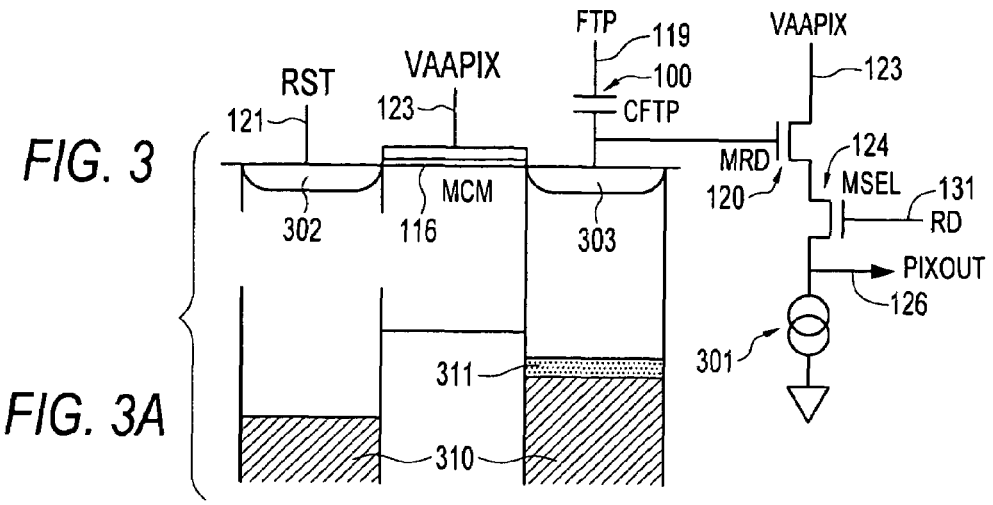
FIG. 3A
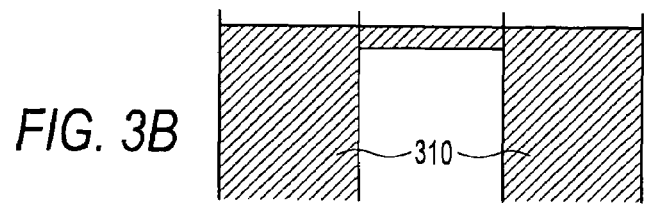
FIG. 3B
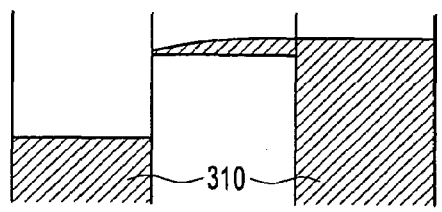
FIG. 3C
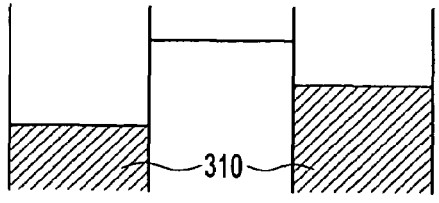
FIG. 3D

FIG. 5
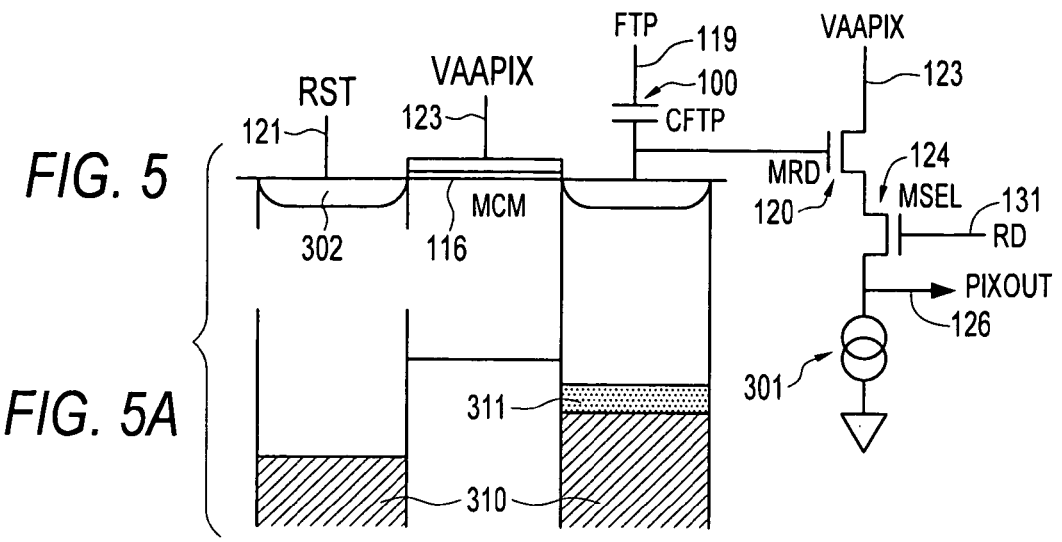
FIG. 5A
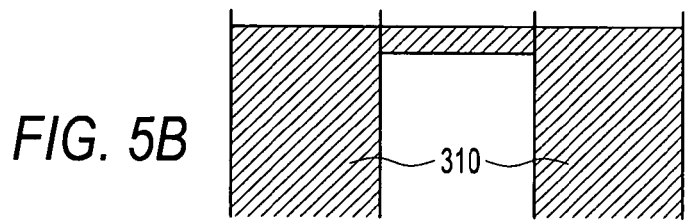
FIG. 5B
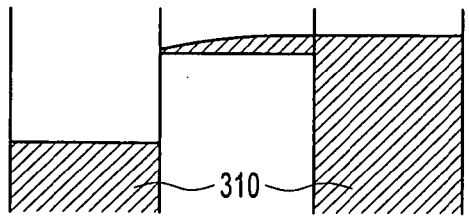
FIG. 5C
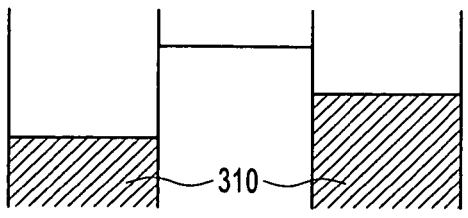
FIG. 5D

WIDE DYNAMIC RANGE ACTIVE PIXEL WITH KNEE RESPONSE

The present invention relates to a method of operating a pixel circuit to increase intrascene dynamic range while reducing fixed pattern noise.

BACKGROUND OF THE INVENTION

Intrascene dynamic range refers to the range of incident light that can be accommodated by an image sensor in a single frame of pixel data. Examples of scenes that generate high dynamic range incident signals include an indoor room with outdoor window, an outdoor scene with mixed shadows and bright sunshine, night-time scenes combining artificial lighting and shadows and, in an automotive context, an auto entering or about to leave a tunnel or shadowed area on a bright day.

Dynamic range is measured as the ratio of the maximum signal that can be meaningfully imaged by a pixel of the imager to its noise level in the absence of light. Typical CMOS active pixel sensors (and charge coupled device (CCD)) sensors have a dynamic range from 60 to 75 dB. This corresponds to light intensity ratios of 1000:1 to about 5000:1. Noise in image sensors, including CMOS active pixel image sensors, is typically between 10 and 50 e-rms. The maximum signal accommodated is approximately 30,000 to 60,000 electrons. The maximum signal is often determined by the charge-handling capacity of the pixel or readout signal chain. Smaller pixels typically have smaller charge handling capacity.

Typical scenes imaged by cameras have lighting levels that generate signals on the order of 10–1,000 electrons under low light (1–100 lux), 1000–10,000 electrons under indoor light conditions (100–1000 lux), and 10,000–>1,000,000 electrons (1000–100,000 lux) under outdoor conditions. To accommodate lighting changes from scene to scene, the so-called interscene dynamic range, an electronic shutter is used to change the integration time of all pixels in the arrays from frame to frame.

To cover a single scene that might involve indoor lighting (100 lux) and outdoor lighting (50,000 lux), the required intrascene dynamic range is of the order of 5,000:1 (assuming 10 lux of equivalent noise) corresponding to 74 dB. In digital bits, this requires 13–14 bits of resolution. However, most CMOS active pixel sensors have only 10 bits of output and 8 bits of resolution typically delivered to the user in most image formats such as JPEG. Companding of the data is often used to go from 10–12 bits to 8 bits. One type of companding is gamma correction, where roughly the square root of the signal is generated.

In order to accommodate high intrascene dynamic range, several different approaches have been proposed in the past. A common denominator of most approaches is performing signal companding within the pixel by having either a total conversion to a log scale (so-called logarithmic pixel) or a mixed linear and logarithmic response in the pixel. One example of a mixed linear and logarithmic circuit can be found in co-pending and commonly assigned patent application Ser. No. 10/226,127, filed Aug. 23, 2002, titled "A Wide Dynamic Range Linear-And-Log Active Pixel," the disclosure of which is incorporated by reference herein.

These prior approaches have several major drawbacks. First, the knee point in a linear-to-log transition is difficult to control, leading to fixed pattern noise in the output image. Second, under low light, the log portion of the circuit is slow to respond, leading to lag. Third, a logarithmic representation of the signal in the voltage domain (or charge domain) means that small variations in signal due to fixed pattern noise leads to large variations in the represented signal.

Linear approaches have also been described where the integration time is varied during a frame to generate several different signals. This approach has architectural problems if the pixel is read out at different points in time since data must be stored in an on-board memory before the signals can be fused together. Another approach is to integrate two different signals in the pixel, one with low gain and one with high gain. However, the low gain portion of the pixel often presents color separation processing problems.

BRIEF SUMMARY OF THE INVENTION

The present invention relates to increasing intra-scene dynamic range for image capturing in a pixel circuit. In one aspect, the invention provides a pixel circuit having an integration node; a conversion transistor having a source/drain connected to the integration node and a drain/source connected to a reset line; a feed-through pulse capacitor having one leg connected to a feed-through pulse signal line and the other leg connected to the integration node; a photodiode having one leg connected to the integration node; and an output transistor having a gate connected to the integration node.

The pixel circuit of the present invention can be operated such that one or more feed-through pulse (FTP) signals are transmitted to an integration node after a first linear integration time period. After the FTP signal is transmitted, a second linear integration period is initiated on the pixel circuit, where the photo conversion gain of the pixel circuit becomes reduced due to leaked electrons from the photodiode. By generating overflow current in a transfer transistor during medium and high illumination conditions in one embodiment of the invention, the pixel circuit can operate with less noise. Such operation creates a pixel with a photo response having multiple "knee" points, where each "knee" in the photo response curve creates separate regions with photo sensitivities that can be independently controlled with minimal thermal interference.

The disclosed configuration further provides added flexibility to controlling the photo response of a pixel circuit. By adjusting the FTP signal voltage (e.g., high, medium, low) and/or the integration time period, the photo response may be more easily suited to the needs of users.

In another aspect, the invention provides a method of operating the pixel circuit, where an overflow pulse is transmitted on a feed-through pulse (FTP) line during a blanking period. During the blanking period, scanned data is not transmitted; thus noise from the FTP line is significantly reduced in the resulting video signal.

In yet another embodiment, a FTP signal is used in conjunction with a readout signal RD in the pixel circuit to further stabilize knee responses during a multiple-knee operation during an overflow condition.

These and other features and advantages of the invention will be more clearly seen from the following detailed description of the invention which is provided in connection with the accompanying drawings.

BRIEF DESCRIPTION OF THE DRAWINGS

FIG. 3 partially illustrates the pixel circuit of FIG. 1A fabricated on a semiconductor substrate;

FIG. 3A is a potential distribution diagram relating to the circuit of FIG. 3, illustrating a signal level readout condition on the reset region and the photodiode region under a low illumination condition;

FIG. 3B is a potential distribution diagram relating to the circuit of FIG. 3, illustrating a bias charge injection condition on the reset region and the photodiode region under a low illumination condition;

FIG. 3C is a potential distribution diagram relating to the circuit of FIG. 3, illustrating a bias charge overflow condition on the reset region and the photodiode region under a low illumination condition;

FIG. 3D is a potential distribution diagram relating to the circuit of FIG. 3, illustrating a reset level readout condition and the beginning of a first integration on the reset region and the photodiode region under a low illumination condition;

FIG. 5 partially illustrates the pixel circuit of FIG. 1A fabricated on a semiconductor substrate;

FIG. 5A is a potential distribution diagram relating to the circuit of FIG. 3, illustrating a signal level readout condition on the reset region and the photodiode region under a medium illumination condition;

FIG. 5B is a potential distribution diagram relating to the circuit of FIG. 3, illustrating a bias charge injection condition on the reset region and the photodiode region under a medium illumination condition;

FIG. 5C is a potential distribution diagram relating to the circuit of FIG. 3, illustrating a bias charge overflow condition on the reset region and the photodiode region under a medium illumination condition;

FIG. 5D is a potential distribution diagram relating to the circuit of FIG. 3, illustrating a reset level readout condition and the beginning of a first integration on the reset region and the photodiode region under a medium illumination condition;

DETAILED DESCRIPTION OF THE INVENTION

Figure 1:
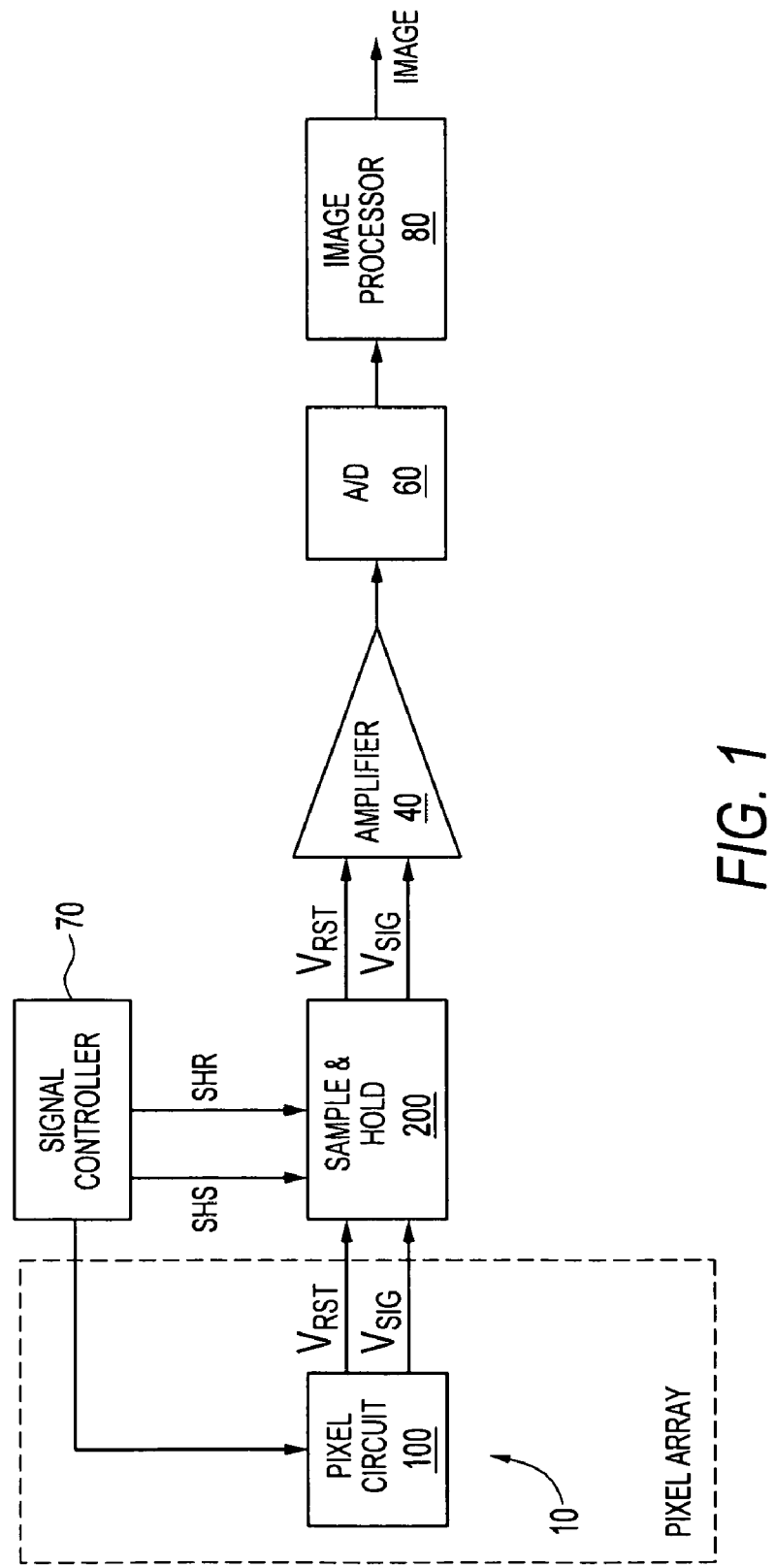
FIG. 1 is a block diagram of an imaging device of an embodiment of the present invention.

Embodiments of the present invention are employed in a CMOS imaging device generally illustrated in FIG. 1 by reference numeral 10. The imaging device includes an array of pixels arranged in rows and columns with each pixel having a pixel circuit 100, each pixel being associated with a column line to which all pixels of that column are connected, the pixels being selected row-by-row. The pixel circuit 100 provides a reset signal $V_{RST}$ and a pixel image signal $V_{SIG}$ as outputs during a reset and integration period, respectively, which are captured by a sample and hold circuit 200 associated with that column in response to sampling signals SHS (for the image signal) and SHR (for the reset signal), respectively. The sample and hold circuit 200 passes the reset signal $V_{RST}$ and image signal $V_{SIG}$ of a pixel circuit 100 to an amplifier 40 which in turn provides a signal representing the difference between the reset signal and pixel image signal ($V_{RST}$–$V_{SIG}$) as an output. This difference signal is provided to an analog to digital converter 60 and, from there, to an image processor 80 which receives digitized pixel signals from all pixel circuits 100 of the pixel array and provides an image output.

Figure 1A:
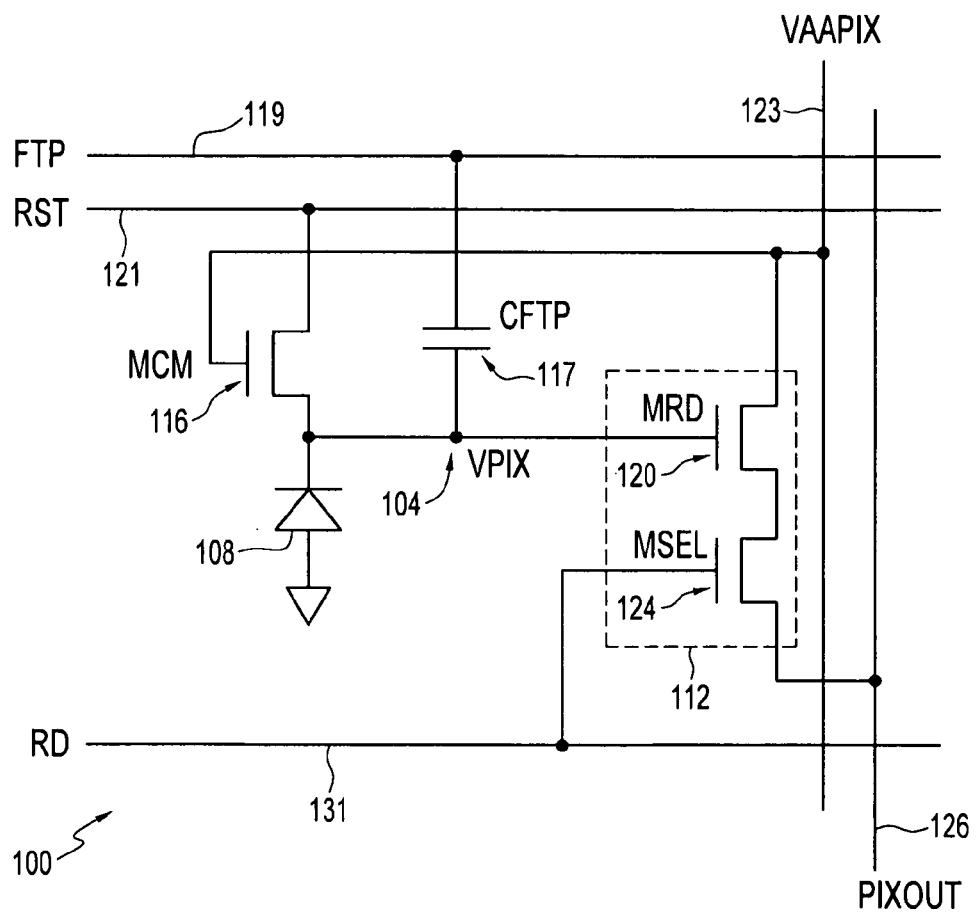
FIG. 1A is a schematic diagram of an active pixel circuit of an embodiment of the present invention.

An active pixel circuit 100 in accordance with an embodiment of the invention is shown in greater detail in FIG. 1A. Pixel circuit 100 includes a transfer transistor 116, an output transistor 120, a row select transistor 124, a photodiode 108, and a feed-through capacitor 117. Also provided are a row select signal line 131 receiving a row select signal RD, a reset signal line 121 receiving a reset signal RST and a feed through pulse line 119 receiving a feed through pulse signal FTP. A voltage supply line 123 is also provided which supplies a voltage VAAPIX to the pixel circuit 100.

The transfer transistor 116 has a gate threshold voltage of $V_t$ and is operated either in a shut-off voltage operating mode or a sub-threshold voltage operating mode, as described in greater detail below. The feed through capacitor 117 is located between the horizontal feed through pulse (FTP) signal line 119 and a signal integration node 104. One source/drain region of the transistor 116 is connected to the row reset (RST) signal line 121, while the gate of transistor 116 is connected to the power supply line VAAPIX 123, and the other source/drain region of transistor 116 is connected to integration node VPIX 104. The photodiode 108 is connected to the integration node 104 and ground. One source/drain region of an output transistor 120 is connected to the supply line VAAPIX 123 while the gate of transistor 120 is connected to the integration node 104. The gate of row select transistor 124 is connected to the row select signal line which receives the row select signal RD, while the source/drain regions of the transistor 124 are respectively coupled to output transistor 120 and column line 126.

When connected to the column line 126 through the row select transistor 124 as described above, the output transistor 120 operates as a source follower transistor and provides a gain to the charge signal received from node 104.

As noted, transistor 116 has two operating modes. One operating mode is a shut-off operating mode in which the transistor 116 imparts a linear output to an accumulated pixel image signal $V_{SIG}$ at node 104 during a charge integration period, while the other operating mode is a sub-threshold operating mode which imparts a logarithmic output to the pixel image signal $V_{SIG}$ accumulated at node 104. The SHS and SHR pulses correspond to when the signal and reset voltages, respectively, are sampled. As with the control lines FTP, RD, and RST discussed below, the SHR and SHS pulses are produced by the signal controller 70.

Figure 2:
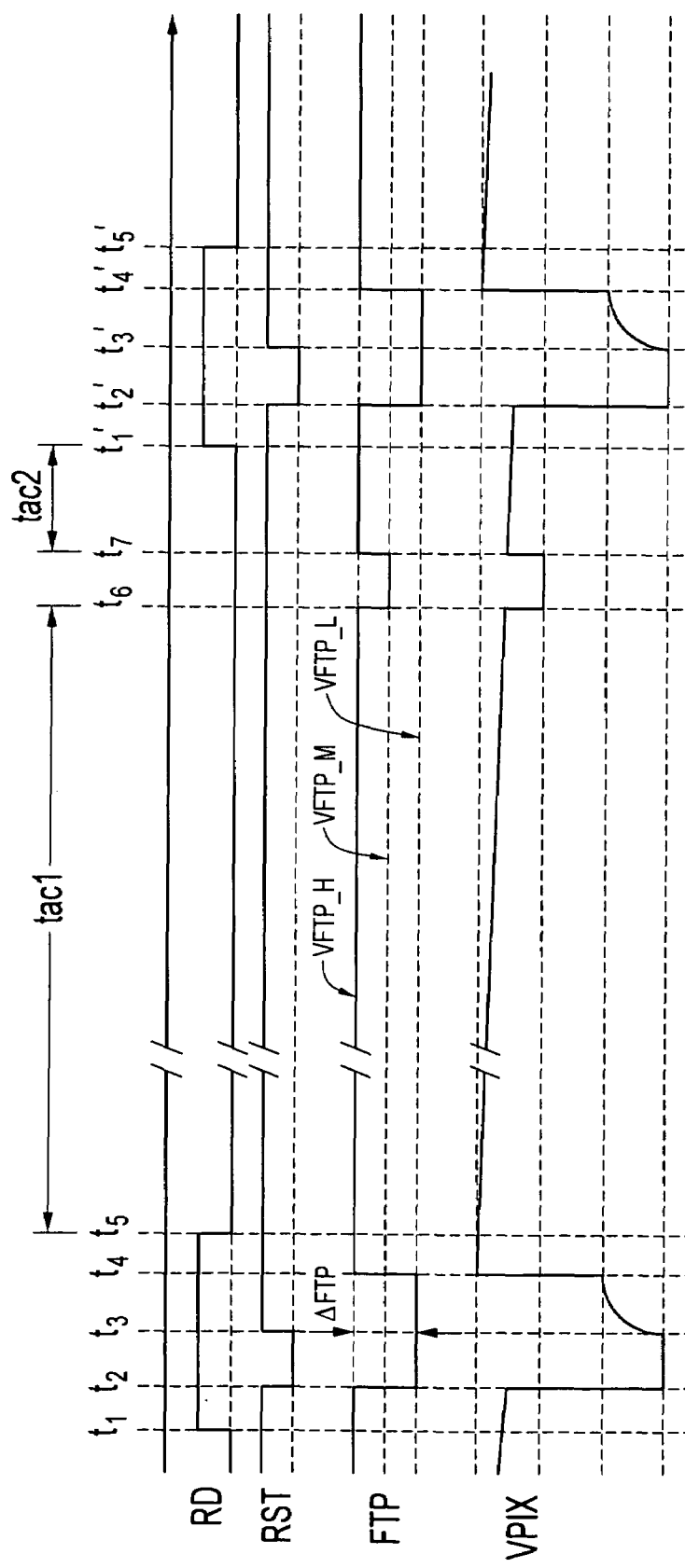
FIG. 2 is an exemplary timing diagram illustrating the operation of the FIG. 1A pixel circuit under low illumination.

The operation of the pixel circuit 100 will now be explained with reference to the timing diagram of FIG. 2, which shows a typical frame cycle during operation of the pixel circuit 100 under a low illumination condition. At time $t_1$, the sample and hold signal SHS pulse (not shown) initiates a pixel image sampling signal to be applied to a sample and hold circuit which causes the pixel image signal $V_{SIG}$ to be sampled and held. The read out signal RD at time $t_1$ is also high, signifying that charge accumulated at a node 104 is being read out. This charge is accumulated at node 104 prior to the time $t_1$. At time $t_2$, the RST line and the feed-through pulse line (FTP) go low (shown as $V_{FTP\_L}$ for the feed-through pulse). This causes $V_{PIX}$, the voltage at node 104, to be set to the RST line 121 low voltage. At time $t_3$, the RST line 121 goes high, which begins the process of resetting the pixel. This causes $V_{PIX}$, the voltage at node 104, to begin increasing. The voltage $V_{PIX}$ may be expressed in terms of equation (1), shown below:

$$V_{PIX}(t) = \frac{1}{\beta}\ln[kt + \exp(\beta \times V_{PIX}(t_3))] \quad (1)$$

where $$k = \frac{\beta I_0}{C_{pix}}\exp[\beta(VAAPIX - VT_0)]$$

where β represents an exponential coefficient of the sub-threshold current of transistor 116, $I_0$ represents the sub-threshold current of transistor 116, $VT_0$ represents the sub-threshold voltage, and $C_{pix}$ represents the total capacitance at the node 104. After the resetting operation is initiated, charge from the reset node is subtracted from any prior signal levels, thus significantly reducing or even eliminating offset variation in the pixel.

At time $t_4$, FTP pulse goes high, causing VPIX to reach the level shown in equation (2) below:

$$V_{PIX}(t_4) = \frac{1}{\beta}\ln[kt_{RST}] + \frac{C_{FTP}}{C_{pix}}(V_{FTP\_H} - V_{FTP\_L}) \quad (2)$$

where $t_{RST}$ represents the overflow reset time ($t_4-t_3$). The second term of equation (2) represents feed-through charge injected by the FTP pulse, where $C_{FTP}$ represents the capacitance of capacitor 117, $C_{pix}$ represents the total capacitance at the node 104, and $V_{FTP\_H}$ and $V_{FTP\_L}$ are the high and low levels of the FTP pulse illustrated in FIG. 2. It should be noted that $C_{pix}$ consists of $C_{FTP}$ and also includes the capacitance of the photodiode 108 and the sum of parasitic capacitances of the circuit 100 such as the gate capacitance of the transistor 120, and the junction capacitance of the source node of the transistor 116. Prior to a reset operation, a substantial amount of charge is injected into the pixel capacitor $C_{FTP}$ and its potential is then pinned at the 'low' level of the RST line as shown between the time period $t_2-t_3$ of FIG. 2. Because of this pinning action, the primary integrated signal is fully discharged from $C_{pix}$, so that the reset operation completely resets the circuit 100, and excess charge from previous imaging cycles of the circuit 100 does not 'lag' into following imaging cycles.

At time $t_5$, the RD line goes low, ending the first readout process, thus beginning a charge accumulation (integration) period. During the period from $t_5$ to $t_6$, the transfer transistor 116 operates in an shut-off mode and a linear accumulated charge signal is processed at the node 104.

At the point $t_6$, the FTP signal drops to a medium level ($V_{FTP\_M}$), which interrupts the integration period. A signal charge, represented by $I_{ph} \times$tac1, is accumulated at the pixel node $V_{PIX}$ 104, where $I_{ph}$ represents the photocurrent present at the node, and tac1 represents the first integration period ($t_6-t_5$). When the FTP pulse drops to $V_{FTP\_M}$ at $t_6$, $V_{PIX}$ reaches the level shown in equation (3) below:

$$V_{PIX}(t_6) = V_{PIX}(t_4) - \frac{I_{ph} \times tac1}{C_{pix}} - \frac{C_{FTP}}{C_{pix}}(V_{FTP\_H} - V_{FTP\_M}) \quad (3)$$

If the accumulated charge at the pixel node 104 is sufficiently small, the bias transistor MCM 116 will not turn on, and the accumulated charge will remain at node 104. Thus the FTP pulse does not influence the signal charge, and $V_{PIX}$ returns back to its initial voltage level at $t_7$, when the FTP pulse goes back to $V_{FTP\_H}$, as shown in FIG. 2. Once the FTP pulse reaches $V_{FTP\_H}$ at $t_7$, the integration period resumes, where the voltage $V_{PIX}$ becomes:

$$V_{PIX}(t_7) = V_{PIX}(t_4) - \frac{I_{ph} \times tac1}{C_{pix}} \quad (4)$$

At the time $t_1'$ the charge accumulation (integration) period ends and the accumulated pixel voltage $V_{PIX}$ is read out by the transistors 120, 124 as the pixel image signal $V_{SIG}$, and a new frame cycle begins. After the end of the second integration period, a charge of $I_{ph} \times$tac2 is additionally integrated, where $I_{ph}$ represents the photocurrent at node 104, and tac2 represents the second integration time period signified by $t_1'-t_7$. The voltage $V_{PIX}$ at time $t_1'$ may be expressed as:

$$V_{PIX}(t_1') = V_{PIX}(t_4) - \frac{I_{ph} \times tac1}{C_{pix}} - \frac{I_{ph} \times tac2}{C_{pix}} \quad (5)$$

The photo response of pixel circuit 100 can thus be expressed as:

$$Sig = G_{SF} \times \left( \frac{I_{ph} \times tac1}{C_{pix}} + \frac{I_{ph} \times tac2}{C_{pix}} \right) \quad (6)$$

$$= G_{SF} \times \frac{I_{ph}}{C_{pix}} \times (t'_1 - t_5)$$

where $G_{SF}$ represents the source-follower gain.

Turning to FIG. 3, a portion of the circuit of FIG. 1A is illustrated as an embodiment fabricated on a semiconductor substrate, for example, a silicon substrate. Reset line 121 is shown being connected to reset electrode region 302, which is adjacent to transfer transistor MCM 116. Transistor MCM 116 is further coupled to the VAAPIX line 123 as shown in FIG. 3. The FTP 119 line is connected to capacitor CFTP 100, which connects further to the photodiode region 303, and to the gate of readout transistor 120. One source/drain terminal of readout transistor 120 is coupled to the VAAPIX line, while the other source/drain terminal of transistor 120 is connected to a source/drain terminal of transistor 124. The gate of transistor 131 is connected to the row select line 131, and the other source/drain terminal is connected to the output PIXOUT, and to an external load 301, which has been illustrated as a current source in FIG. 3.

Figure 3E:
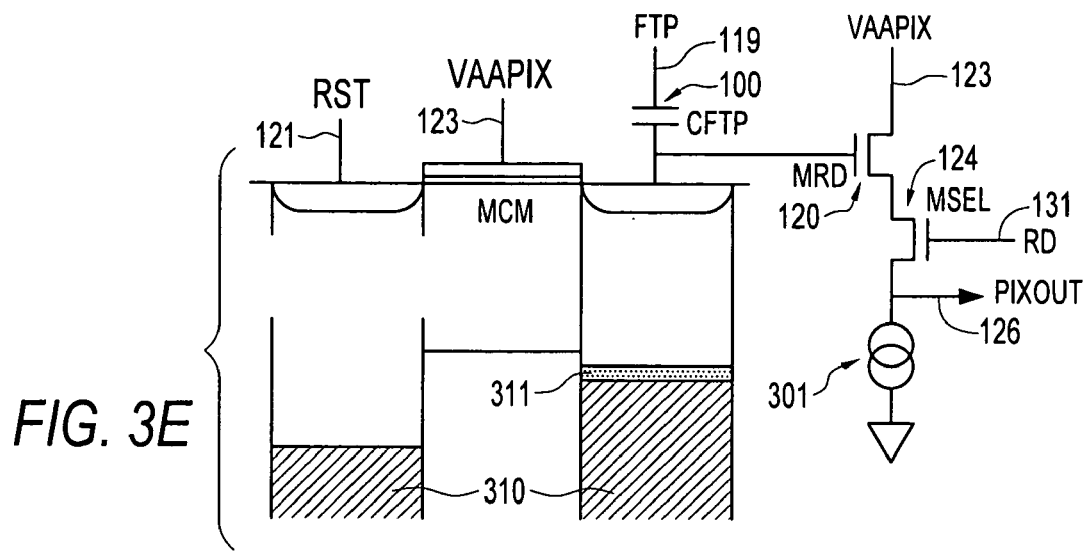
FIG. 3E is a potential distribution diagram relating to the circuit of FIG. 3, illustrating an overflow condition on the reset region and the photodiode region under a low illumination condition.
Figure 3F:
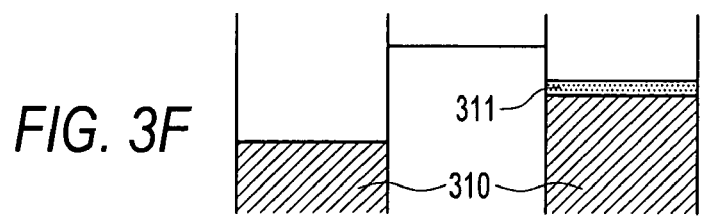
FIG. 3F is a potential distribution diagram relating to the circuit of FIG. 3, illustrating a signal level readout condition on the reset region and the photodiode region under a low illumination condition.
Figure 3G:
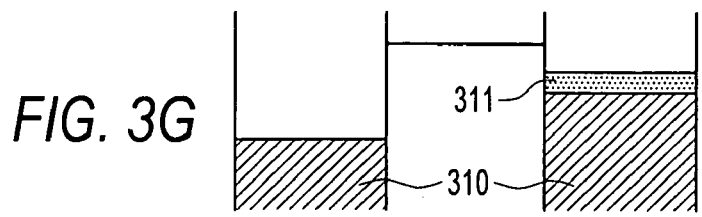
FIG. 3G is a potential distribution diagram relating to the circuit of FIG. 3, illustrating the completion of a second integration on the reset region and the photodiode region under a low illumination condition.

FIGS. 3A–3G illustrate an exemplary potential distribution diagram for the circuit of FIG. 3 under a low-illumination condition, where the potential charge, or electrons 310 between regions 302 and 303 are illustrated. The barrier between the reset region 302 and the photodiode region 303 electrically isolates the photodiode region from the transfer transistor 116 during the integration period. Thus, any photo-generated charge 311 produced by photodiode 303 is initially stored in the right well region. The left-well region associated with reset node 302 is directly connected to reset line RST 121, and stores the charge received from the reset RST 121 line.

Turning to FIG. 3A, the exemplary potential distribution diagram illustrates the potential charge 310 present during the low illumination signal level readout at time $t_1$, wherein the photodiode region accumulates photo-generated charge 311 after a previous integration period. Since the sum of the potential charge 310 and photo-generated charge potential 311 does not exceed the barrier potential, the potential is held in the diode region 303. At time $t_2$, both the RST pulse and the FTP pulse go low (see FIG. 2), at which time all regions are filled with electrons 310, via a bias charge, as shown in FIG. 3B.

Turning to FIG. 3C, when the RST pulse goes high at time $t_3$ (see FIG. 2), a bias charge overflow occurs in the reset region 302, and the excess bias charge is swept away from the reset region 302. If the reset region 302 potential exceeds the barrier potential, the photodiode region 303 potential is pinned at the potential of the reset region by an electrical channel (not shown) formed at the barrier region. Since transistor 116 is operating in the subthreshold region, the overflow current ($I_{MCM}$) can be expressed as:

$$I_{MCM} = I_0 \exp[\beta \times (VAAPIX - V_{PIX} - VT_0)] \quad (7)$$

where $I_0$ represents the sub-threshold current of transfer transistor 116, and $VT_0$ represents the sub-threshold voltage across transfer transistor 116.

At time $t_4$, illustrated in FIG. 3D, the feed-through pulse FTP goes high (see FIG. 2), and the reset level is read out and subtracted from the prior readout signal level so that offset variation of the pixel can be eliminated. After the first integration period, when $t=t_6$ (see FIG. 2), additional photo-generated charge 311 is accumulated at the photodiode region as shown in FIG. 3E. However, since the potential is not great enough under low illumination to overcome the barrier, the charge is held in the photodiode region 303. In FIG. 3F, the additional charge 311 is integrated after $t_7$ (See FIG. 2), wherein the integration period ends at $t=t_1'$ (FIG. 3G), and a voltage readout occurs where the voltage from the photodiode region is read by source followed transistor 120 and row select transistor 124 onto the PIXOUT line 126.

Figure 4:
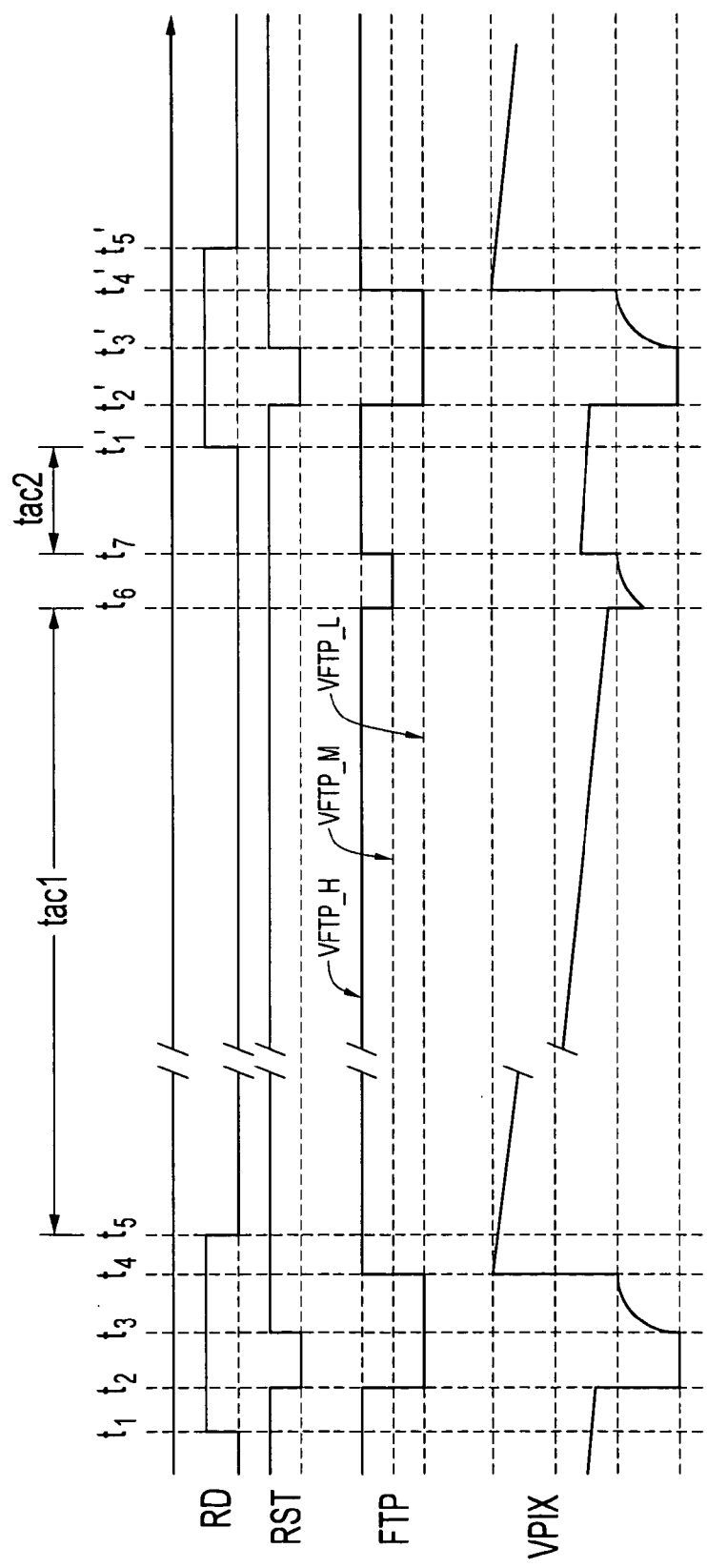
FIG. 4 is an exemplary timing diagram illustrating an operating condition of the FIG. 1A pixel circuit under medium illumination.

Turning to FIG. 4, the exemplary timing diagram shows a typical frame cycle during operation of the pixel circuit 100 under a medium illumination condition. For times $t_1$ to $t_5$, the timing operation is substantially identical to the corresponding times illustrated in the low illumination timing diagram of FIG. 2. After time $t_5$, pixel circuit undergoes an integration period (tac1) under medium illumination. During the integration period under a medium illumination condition, the voltage $V_{PIX}$ can be expressed as:

$$V_{PIX}(t_4) - \frac{I_{ph} \times tac1}{C_{pix}} \quad (8)$$

where $I_{ph}$ is the photodiode current, and $C_{pix}$ is the total capacitance at the integration node 104. When the FTP pulse transitions from $V_{FTP\_H}$ to $V_{FTP\_M}$ at time $t_6$, $V_{PIX}$ drops to a lower level (represented by equation (3) above), causing transfer transistor MCM 116 to turn on. Once transistor 116 turns on, the accumulated photo-charge is drained through transistor 116, and the VPIX voltage at time $t_7$ is:

$$V_{PIX}(t_7) = \frac{1}{\beta}\ln[k(t_7 - t_6)] + \frac{C_{FTP}}{C_{pix}}(V_{FTP\_H} - V_{FTP\_M}) \quad (9)$$

and if the time period between $t_7$ and $t_6$ is set at the same length of the reset time $t_{RST}$ ($t_4-t_3$), equation (9) becomes:

$$V_{PIX}(t_7) = V_{PIX}(t_4) - \frac{C_{FTP}}{C_{pix}}(V_{FTP\_M} - V_{FTP\_L}) \quad (10)$$

The difference between the circuit 100 operation under low illumination operation versus medium illumination operation can be defined by equation (11) shown below:

$$\frac{I_{ph} \times tac1}{C_{pix}} = \frac{C_{FTP}}{C_{pix}}(V_{FTP\_M} - V_{FTP\_L}) \quad (11)$$

where, if photodiode current $I_{ph}$ is larger than the photodiode transition point, excess charge overflows through transistor MCM 116 and a medium illumination condition begins. The photodiode transition point can be expressed as:

$$I_{ph(transition)} = \frac{C_{FTP}}{tac1}(V_{FTP\_M} - V_{FTP\_L}) \quad (12)$$

After $t_7$, FTP pulse goes back high, and pixel circuit 100 resumes charge accumulation under a second accumulation period ($t_1'-t_7=tac2$). If the second accumulation period (tac2) is shorter than the first accumulation period (tac1), signal $I_{ph} \times tac2$ is added to the integration node 104. When the reset pulse RD ends the accumulation period at t1', VPIX may be expressed as:

$$V_{PIX}(t_1') = V_{PIX}(t_4) - \frac{C_{FTP}}{C_{pix}}(V_{FTP\_M} - V_{FTP\_L}) - \frac{I_{ph} \times tac2}{C_{pix}} \quad (13)$$

By subtracting the offset from the signal, the photo response of pixel circuit 100 can be expressed as:

$$Sig = \frac{G_{SF}}{C_{pix}} \times [C_{FTP} \times (V_{FTP\_M} - V_{FTP\_L}) + I_{ph} \times tac2] \quad (14)$$

Turning to FIG. 5, a portion of the circuit of FIG. 1A is illustrated as an embodiment fabricated on a semiconductor substrate. The circuit of FIG. 5 is substantially identical to the circuit of FIG. 3, which was discussed above.

Figure 5E:
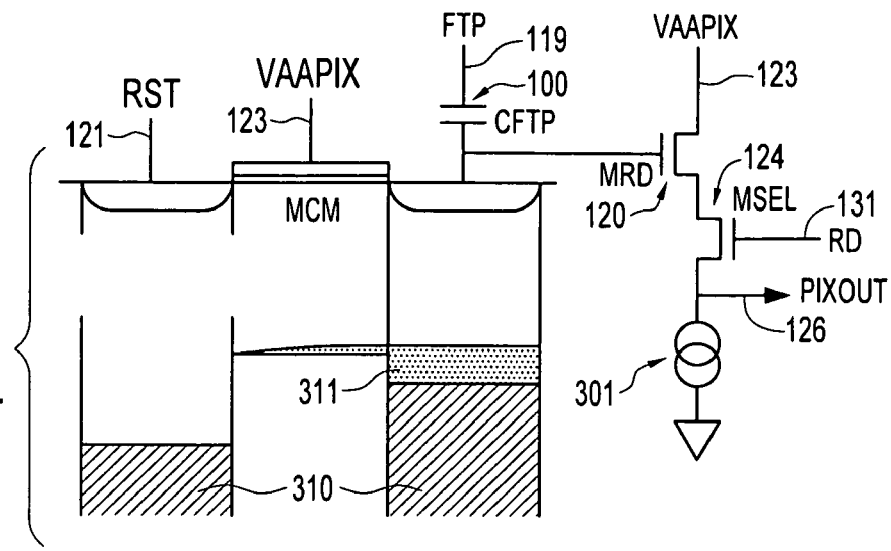
FIG. 5E is a potential distribution diagram relating to the circuit of FIG. 3, illustrating an overflow condition on the reset region and the photodiode region under a medium illumination condition.
Figure 5F:
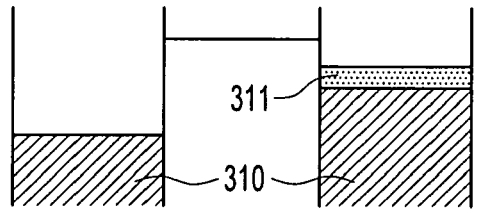
FIG. 5F is a potential distribution diagram relating to the circuit of FIG. 3, illustrating a signal level readout condition on the reset region and the photodiode region under a medium illumination condition.
Figure 5G:
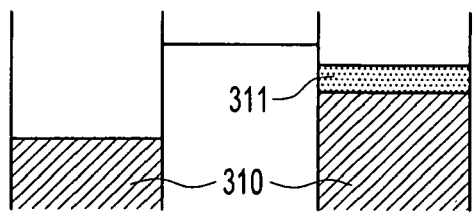
FIG. 5G is a potential distribution diagram relating to the circuit of FIG. 3, illustrating the completion of a second integration on the reset region and the photodiode region under a medium illumination condition.

FIGS. 5A–G illustrate exemplary potential distribution diagrams for the circuit of FIG. 5 under a medium-illumination condition, where the potential charge, or electrons 310 between regions 302 and 303 are illustrated. Turning to FIG. 5A, the exemplary potential distribution diagram illustrates the potential charge 310 present during the medium illumination signal level readout at time $t_1$, wherein the photodiode region accumulates photo-generated charge 311 after a previous integration period. At time $t_2$, both the RST pulse and the FTP pulse go low (see FIG. 4), at which time all regions are filled with electrons 310, via a bias charge as shown in FIG. 5B.

Turning to FIG. 5C, when the RST pulse goes high at time $t_3$ (see FIG. 4), a bias charge overflow occurs in the reset region 302, and the excess bias charge is swept away from the reset region 302. Transistor 116 is operating in the subthreshold region, thus producing the overflow current ($I_{MCM}$) expressed as equation (7), discussed above.

At time $t_4$, illustrated in FIG. 5D, the feed-through pulse FTP goes high (see FIG. 4), and the reset level is read out and subtracted from the prior readout signal level so that offset variation of the pixel can be eliminated. After the first integration period, when $t=t_6$ (see FIG. 4), bias transistor MCM 116 turns on, allowing excess photo-generated charge 311 accumulated at the photodiode region 303 to drain through transistor MCM 116 to the reset region 302 as shown in FIG. 5E.

Turning to FIG. 5F, the second integration period is illustrated, where additional photo-generated charge 311 is accumulated at the photodiode region 303. In FIG. 5F, the additional charge 311 is integrated after $t_7$ (See FIG. 2), wherein the integration period ends at $t=t_1'$ (FIG. 5G), and a voltage readout occurs where the voltage from the photodiode region is read by source followed transistor 120 and row select transistor 124 onto the PIXOUT line 126.

Figure 6:
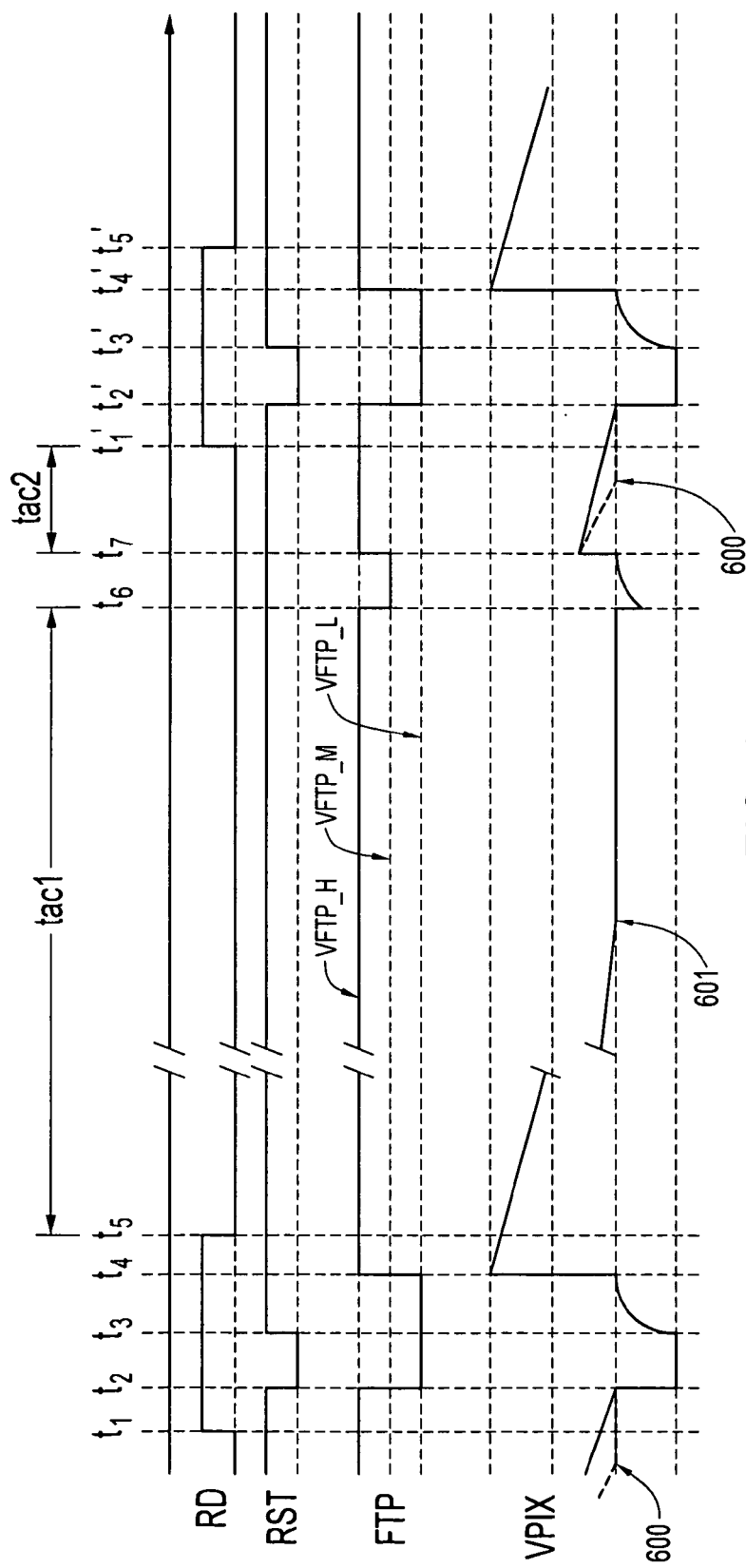
FIG. 6 is an exemplary timing diagram illustrating an operating condition of the FIG. 1A pixel circuit under high illumination.

FIG. 6 shows an exemplary timing diagram of a typical frame cycle during operation of the pixel circuit 100 under a high illumination condition. The timing operation of the FIG. 6 embodiment is substantially identical to the corresponding times illustrated in the medium illumination timing diagram of FIG. 4, except that $V_{PIX}$ reaches a saturation (overflow) point 601 during the first integration period (tac1), as well as during the second integration period (tac2), illustrated by the dotted line 600 in FIG. 6.

Figure 7:
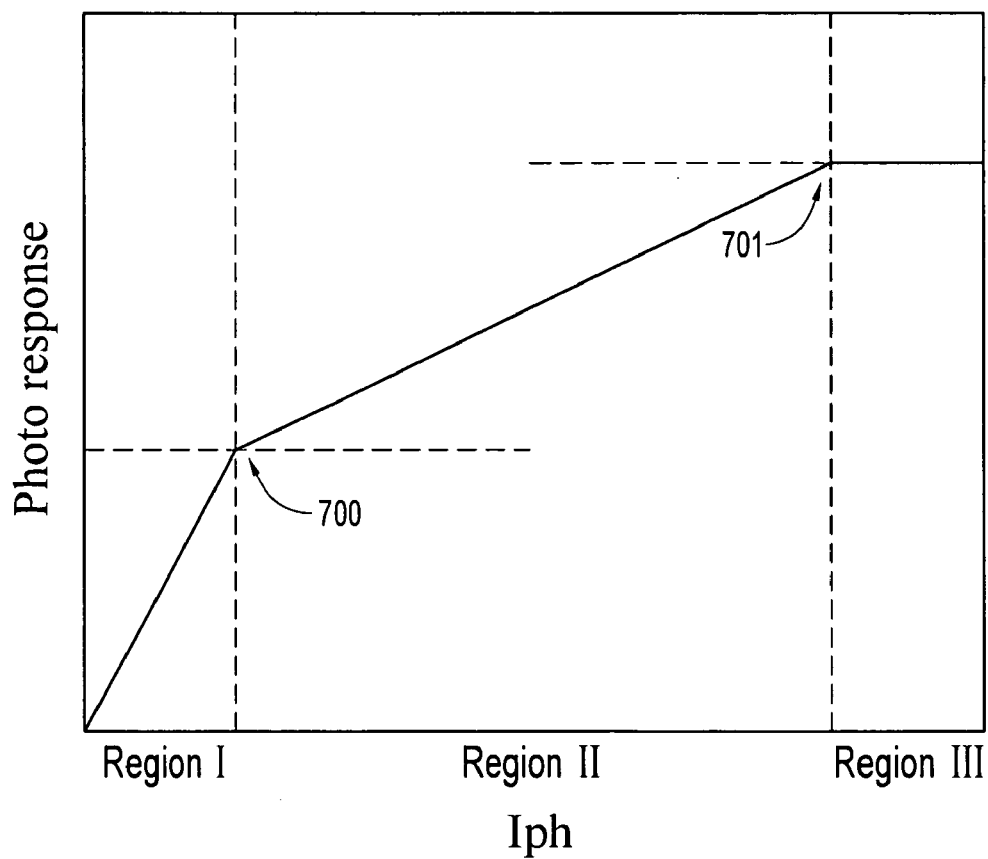
FIG. 7 is a graph illustrating the photo response of the pixel circuit of FIG. 1A under a high illumination condition.

The photo response of pixel circuit 100 is further illustrated in FIG. 7, wherein the photo conversion characteristic has knee points (700, 701) between Regions I and II, and between Regions II and III. Each of the regions may be expressed by the following equations:

Region I $$Iph < \frac{C_{FTP}}{tac1}(V_{FTP\_M} - V_{FTP\_L}) \quad (15)$$

$$Sig = G_{SF} \times \frac{I_{ph}}{C_{pix}} \times (tac1 + tac2) \quad (16)$$

Region II $$\frac{C_{FTP}}{tac1}(V_{FTP\_M} - V_{FTP\_L}) < Iph < \frac{C_{FTP}}{tac2}(V_{FTP\_H} - V_{FTP\_M}) \quad (17)$$

$$Sig = \frac{G_{SF}}{C_{pix}} \times [C_{FTP} \times (V_{FTP\_M} - V_{FTP\_L}) + I_{ph} \times tac2] \quad (18)$$

Region III $$\frac{C_{FTP}}{tac2}(V_{FTP\_H} - V_{FTP\_M}) < Iph \quad (19)$$

$$Sig = \frac{G_{SF}}{C_{pix}} \times C_{FTP} \times (V_{FTP\_H} - V_{FTP\_L}) = saturation \quad (20)$$

By controlling the integration periods tac1 and tac2, the sensitivity of each region can be controlled. Additionally, the output range in each region is controlled by the levels of FTP pulses. If tac1 should become shorter in relation to tac2, the sensitivity in Region II would become lower than that of Region I. Accordingly, the dynamic range of $I_{ph}$ would increase, while the overall output dynamic range remained the same. Since the photoconversion of each region is linear, the image processing required for colored images becomes simplified. Also, the controlled photo response is independent of temperature, so that a more stable performance characteristic can be achieved, and that greater uniformity between pixel outputs can be achieved.

Figure 8:
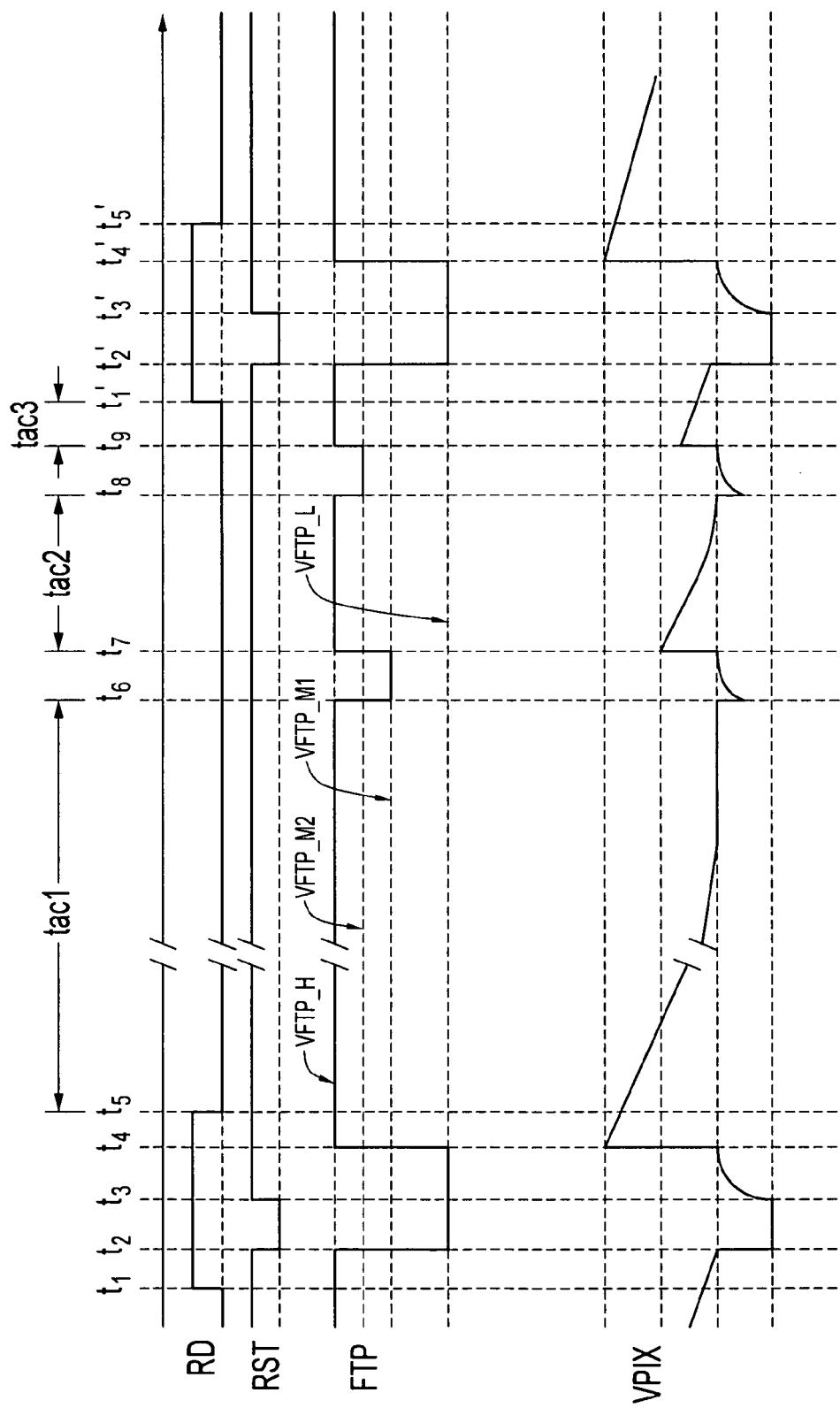
FIG. 8 is an exemplary timing diagram illustrating an operating condition of the FIG. 1A circuit using a multiple-knee response under an alternate embodiment of the invention.
Figure 9:
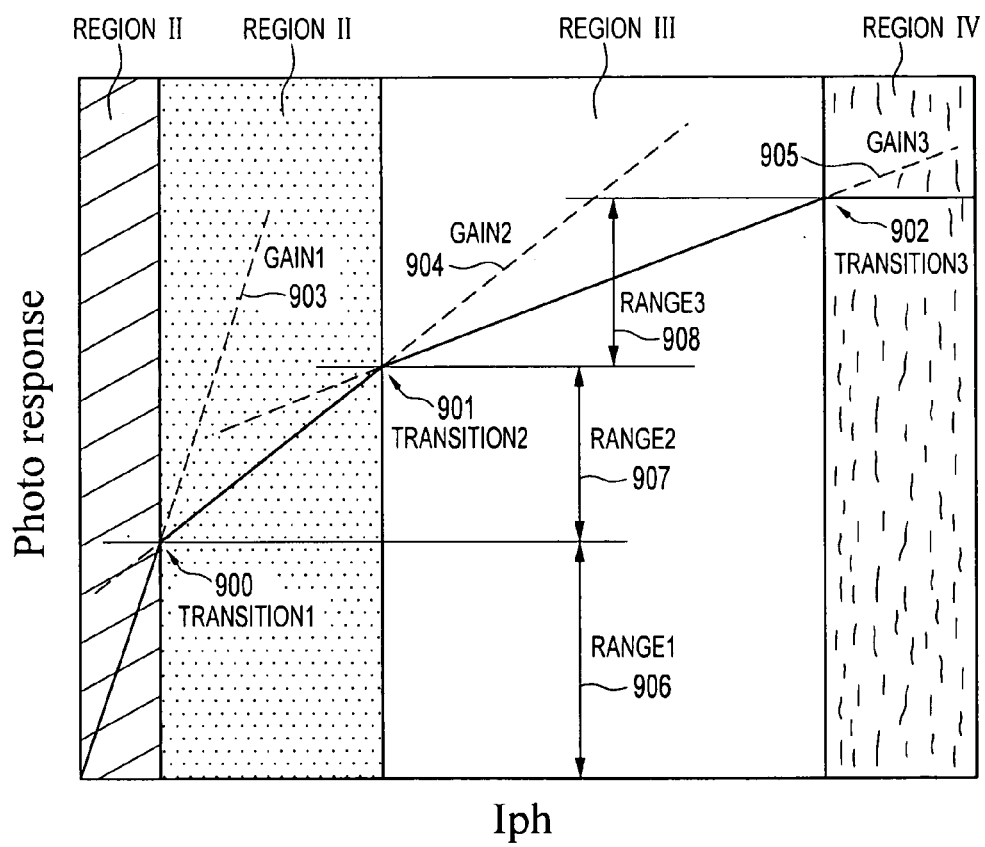
FIG. 9 is a graph of the photo response of the FIG. 1A pixel circuit utilizing the timing diagram of FIG. 8.

FIGS. 8 and 9 are an exemplary timing diagram and a photo conversion graph which illustrate how the circuit of FIG. 1A can be operated to achieve multiple knee points (900–902) through a simple modification in the FTP pulse. It should be understood that the number of "knee," or transition points may be increased further by increasing the number of overflow pulses, and is not limited to the three-transition embodiment discussed herein. The timing diagram in FIG. 8 illustrates three integration periods: tac1 ($t_6-t_5$), tac2 ($t_8-t_7$) and tac3 ($t_1'-t_9$), where two different medium-level voltages ($V_{FTP\_M1}$ and $V_{FTP\_M2}$) are applied to the FTP pulses during the first ($t_7-t_6$) and second ($t_9-t_8$) overflow time periods. Under the exemplary embodiment of FIG. 8, the operation of the circuit is such that tac1>tac2>tac3.

The transition points of each "knee" are dependent upon the photodiode current $I_{ph}$ that is produced after an integration period. Thus, each $I_{ph}$ transition point (900–902) can be expressed as:

$$I_{ph}(transition1) = \frac{C_{FTP}}{tac1}(V_{FTP\_M1} - V_{FTP\_L}) \quad (21)$$

$$I_{ph}(transition2) = \frac{C_{FTP}}{tac2}(V_{FTP\_M2} - V_{FTP\_M1}) \quad (22)$$

$$I_{ph}(transition3) = \frac{C_{FTP}}{tac3}(V_{FTP\_H} - V_{FTP\_M2}) \quad (23)$$

Under a low illumination condition, if $I_{ph}$ does not reach the level expressed in equation (21), no overflow current will subsequently flow in the 1st and 2nd overflow periods. In such a case, the pixel response may be expressed as:

$$V_{PIX}(t1') = V_{PIX}(t_4) - \frac{I_{ph} \times (tac1 + tac2 + tac3)}{C_{pix}} \quad (24)$$

However, when $I_{ph}$ exceeds the transition expressed in equation (21) after the first integration period, overflow current begins to flow during the first overflow period ($t_7$–$t_6$), and the resulting VPIX voltage is pinned by the overflow operation at $t_7$:

$$V_{PIX}(t_7) = V_{PIX}(t_4) - \frac{C_{FTP}}{C_{pix}}(V_{FTP\_M1} - V_{FTP\_L}) \quad (23)$$

After the first overflow period, the pixel continues accumulation of charge during the second (tac2) and third (tac3) integration periods. The resulting $V_{PIX}$ signal being read out at time $t_1'$ can be expressed as:

$$V_{PIX}(t_1') = V_{pix}(t_4) - \frac{C_{FTP}}{C_{pix}}(V_{FTP\_M1} - V_{FTP\_L}) - I_{ph} \times \frac{(tac2 + tac3)}{C_{pix}} \quad (24)$$

As $I_{ph}$ increases further and exceeds the second transition point, overflow current will flow in the second overflow period, pinning the $V_{PIX}$ voltage at time $t_9$:

$$V_{PIX}(t_9) = V_{PIX}(t_4) - \frac{C_{FTP}}{C_{pix}}(V_{FTP\_M2} - V_{FTP\_M1}) \quad (25)$$

thus:

$$V_{PIX}(t_1') = V_{PIX}(t_4) - \frac{C_{FTP}}{C_{pix}}(V_{FTP\_M2} - V_{FTP\_L}) - I_{ph} \times \frac{tac3}{C_{pix}} \quad (26)$$

If $I_{ph}$ becomes sufficiently large and $V_{PIX}$ reaches an overflow level after the third integration period, the photo conversion operation becomes saturated.

Turning to FIG. 9, the illustrated graph shows an exemplary photo conversion response of pixel circuit 100 operating under the timing shown in FIG. 8. The graph in FIG. 9 shows three different photo conversion gain responses (903–905), where each transition "knee" (900–902) results in the formation of Regions I–IV. Each of the regions may be expressed by the following equations:

Region I $$I_{ph} < I_{ph}(transition1) \quad (27)$$

$$Sig = G_{SF} \times \frac{I_{ph}}{C_{pix}} \times (tac1 + tac2 + tac3) \quad (28)$$

Region II $$I_{ph}(transition1) < I_{ph} < I_{ph}(transition2) \quad (29)$$

$$Sig = \frac{G_{SF}}{C_{pix}} \times [C_{FTP} \times (V_{FTP\_M1} - V_{FTP\_L}) + I_{ph} \times (tac2 + tac3)]. \quad (30)$$

Region III $$I_{ph}(transition2) < I_{ph} < I_{ph}(transition3) \quad (31)$$

$$Sig = \frac{G_{SF}}{C_{pix}} \times C_{FTP} \times (V_{FTP\_M2} - V_{FTP\_L}) + I_{ph} \times tac3 \quad (32)$$

Region IV $$I_{ph} > I_{ph}(saturation) \quad (33)$$

$$Sig = \frac{G_{SF}}{C_{pix}} \times C_{FTP} \times (V_{FTP\_H} - V_{FTP\_L}) = saturation \quad (34)$$

Each of the photo response conversion gains 903–905 shown in FIG. 9 are determined by the integration periods tac1–tac3, where $$Gain1 = \frac{1}{tac1 + tac2 + tac3}, Gain2 = \frac{1}{tac2 + tac3}, \text{ and } Gain3 = \frac{1}{tac3}.$$

The ranges of the photo responses (906–908) between transition points (900–902) are a function of the FTP voltage, and may be expressed as Range1=$(V_{FTP\_M1}-V_{FTP\_L})$; Range2=$(V_{FTP\_M2}-V_{FTP\_M1})$ and Range3=$(V_{FTP\_H}-V_{FTP\_M2})$. Thus it can be seen that the range and gain of each region can be controlled by a predetermined pulse height and overflow timing of the FTP pulse, thus providing flexibility in optimizing photo conversion characteristics through the application of different FTP pulses.

Figure 10:
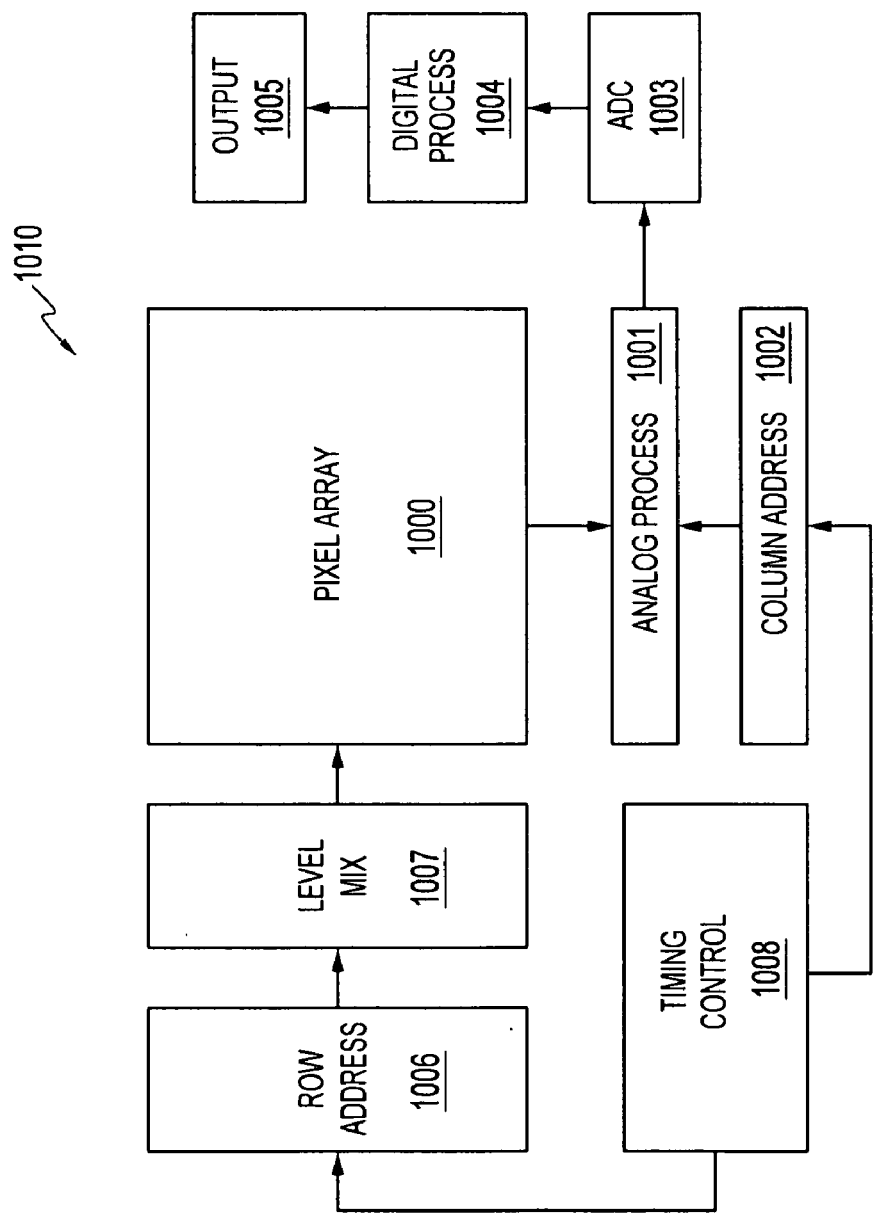
FIG. 10 is a block diagram of an exemplary imager utilizing the knee response pixel of FIG. 8 under another embodiment of the invention.

Turning to FIG. 10, the block diagram illustrates an exemplary embodiment of an imager 1010 using the knee response pixel described above. The imager 1010 consists of a pixel array 1000, having n×m pixels, having a timing control block 1008, which provides driving and control pulses, along with sync signals to external circuits. The row address block 1006 generates row address pulses from address signals received from the timing controller 1008, and transmits the pulses to the level mix block 1007. Level Mix block 1007 generates row pulses, including RD, RST and FTP, for each of the rows (not shown) in the pixel array 1000.

The analog process block 1001 comprises of an amplifier array, a correlated double sampling (CDS) array and an analog memory array (which have been omitted for purposes of simplicity), where pixel outputs from pixel array 1000 are brought up to a required gain level, and where fixed pattern noise caused by variations in the pixel offset are suppressed by the CDS operation and stored in the analog memory array. The column address block 1002 receives column address signals from timing control block 1008, and generates column address pulses that are transmitted to the analog process block 1001, so that stored signals in the analog memory array may be read out. The signal readout from the analog memory is transmitted to the analog-to-digital converter (ADC) block 1003, where the signal is digitally converted and transmitted to the digital process block 1004 for processing (e.g., white balance, color interpolation, gamma correction, etc.). Once processed, the signal is then outputted from the output block 1005.

Figure 11:
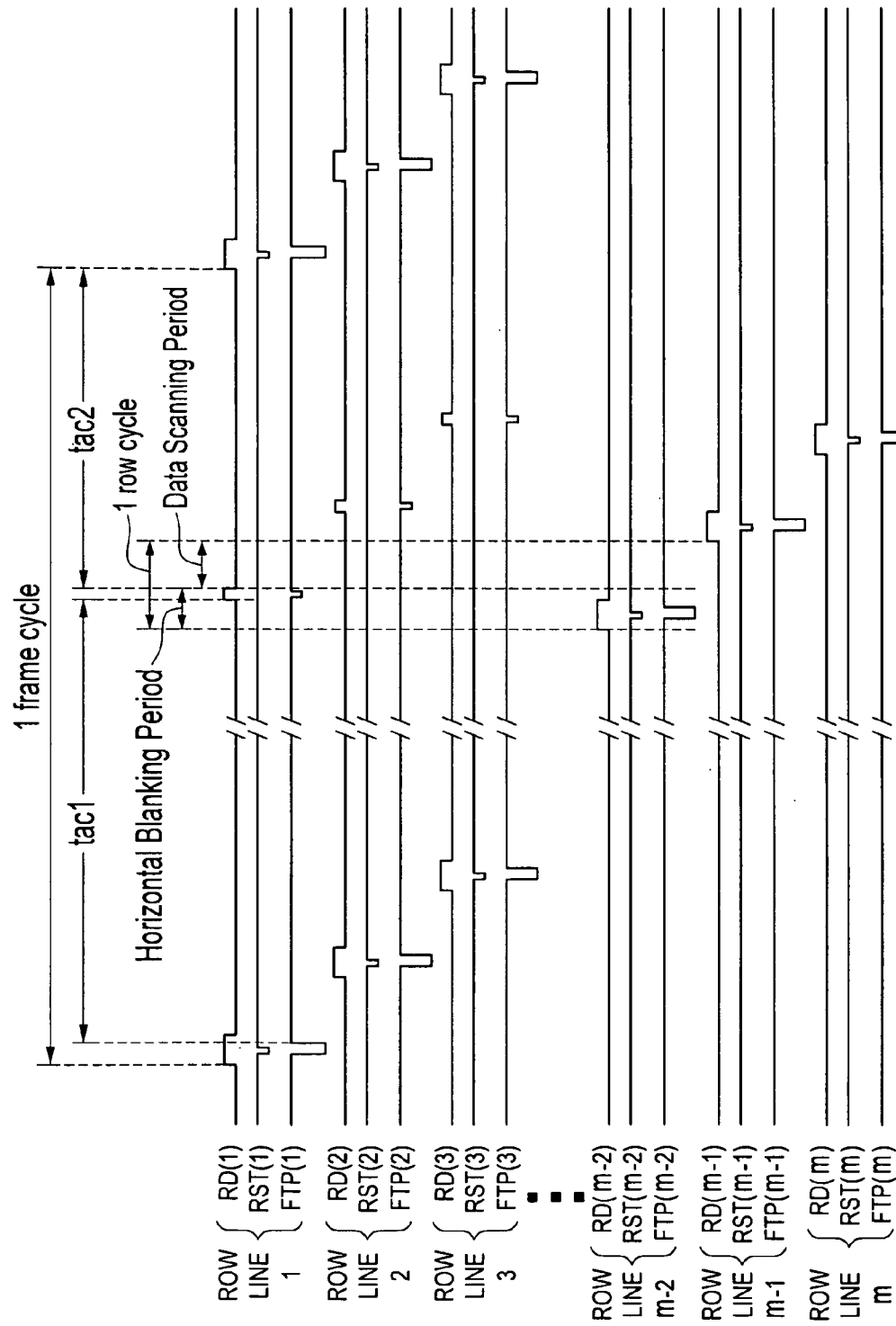
FIG. 11 is an exemplary timing diagram of the imager of FIG. 10.

FIG. 11 illustrates an exemplary timing diagram for one frame cycle having a single "knee" point of the imager of FIG. 10. Signals RD, RST and FTP are output by the level mix block 1007 and are illustrated for each row line (1–m). The SHS and SHR pulses for CDR operation have been omitted for the purpose of clarity. The frame cycle for each row line in the embodiment of FIG. 11 begins when a respective row's RD pulses goes high, and ending when the RD pulse goes high again after two integration periods (tac1, tac2).

Turning to row line 1 of FIG. 11, the row address block 1006 outputs a rows select RD(1) pulse at the beginning of the frame cycle, and subsequently outputs a reset pulse RST(1) to reset the pixels in the first row. After the FTP(1) pulse is outputted, the first integration period tac1 is initiated, and continues until level mix block 1007 generates a short RD(1) pulse, ending the first integration period (tac1), and producing an overflow pulse FTP(1) during the horizontal blanking period of row line m−2.

A row cycle is illustrated in the exemplary embodiment of FIG. 11 between the rising edges of each row select pulses (RD(m−2), RD(m−1)) of adjacent row lines (row line m−2 and row line m−1), where each row cycle is comprised of a horizontal blanking period, followed by a data scanning period. Data stored in the analog memory array in the analog processing circuit 1001 are scanned and read out during the data scanning period, so that, for example, the overflow operation initiated for the first row does not affect data readout for the m−2 row.

Once a row's frame cycle is complete (e.g., row line 1), the operation moves sequentially to the next row (row line 2) to begin a new cycle, until all rows are read, reset and submitted to an overflow operation. Once the last row (row line m) is reached, one frame period will have been completed. In the exemplary embodiment of FIG. 11, signal integration periods tac1 and tac2 are held constant through each row, so that the same photo conversion characteristics and knee responses can be obtained in the entire pixel array region. It should be understood that, while a single "knee" point was described in the embodiment, that multiple knee points can be obtained by providing additional overflow pulses described in the embodiments above.

Figure 12:
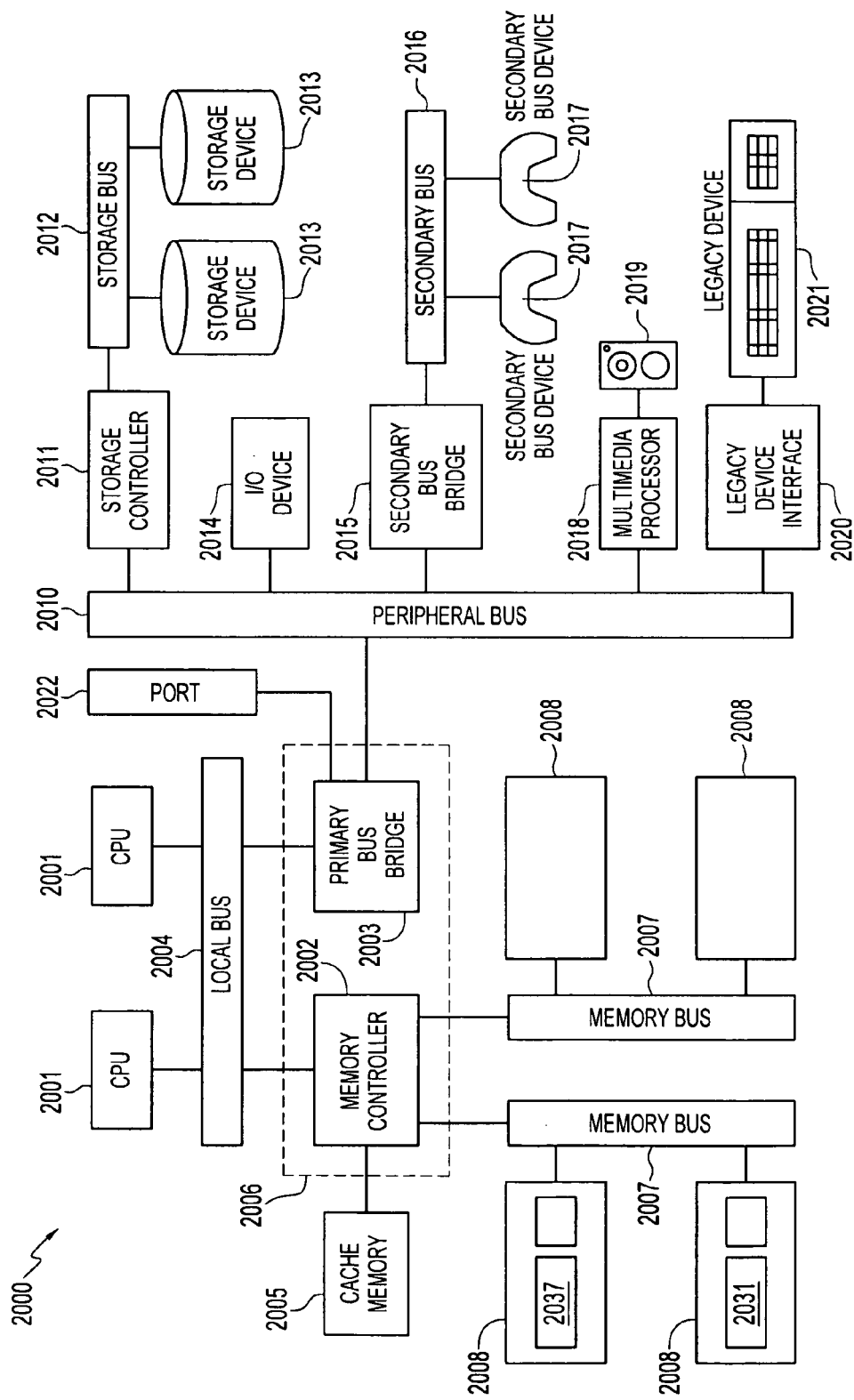
FIG. 12 depicts a block diagram of a processor system employing the FIG. 1A pixel circuit, in accordance with yet another exemplary embodiment of the invention.

FIG. 12 illustrates an exemplary processing system 2000 which utilizes a pixel circuit such as that described in connection with FIGS. 1–11. The processing system 2000 includes one or more processors 2001 coupled to a local bus 2004. A memory controller 2002 and a primary bus bridge 2003 are also coupled the local bus 2004. The processing system 2000 may include multiple memory controllers 2002 and/or multiple primary bus bridges 2003. The memory controller 2002 and the primary bus bridge 2003 may be integrated as a single device 2006.

The memory controller 2002 is also coupled to one or more memory buses 2007. Each memory bus accepts memory components 2008. The memory components 2008 may be a memory card or a memory module. The memory components 2008 may include one or more additional devices 2009. For example, in a SIMM or DIMM, the additional device 2009 might be a configuration memory, such as a serial presence detect (SPD) memory. The memory controller 2002 may also be coupled to a cache memory 2005. The cache memory 2005 may be the only cache memory in the processing system. Alternatively, other devices, for example, processors 2001 may also include cache memories, which may form a cache hierarchy with cache memory 2005. If the processing system 2000 include peripherals or controllers which are bus masters or which support direct memory access (DMA), the memory controller 2002 may implement a cache coherency protocol. If the memory controller 2002 is coupled to a plurality of memory buses 2007, each memory bus 2007 may be operated in parallel, or different address ranges may be mapped to different memory buses 2007.

The primary bus bridge 2003 is coupled to at least one peripheral bus 2010. Various devices, such as peripherals or additional bus bridges may be coupled to the peripheral bus 2010. These devices may include a storage controller 2011, a miscellaneous I/O device 2014, a secondary bus bridge 2015, a multimedia processor 2018, and a legacy device interface 2020. The primary bus bridge 2003 may also be coupled to one or more special purpose high speed ports 2022. In a personal computer, for example, the special purpose port might be the Accelerated Graphics Port (AGP), used to couple a high performance video card to the processing system 2000.

The storage controller 2011 couples one or more storage devices 2013, via a storage bus 2020, to the peripheral bus 2010. For example, the storage controller 2011 may be a SCSI controller and storage devices 2013 may be SCSI discs. The I/O device 2014 may be any sort of peripheral. For example, the I/O device 2014 may be an local area network interface, such as an Ethernet card. The secondary bus bridge may be used to interface additional devices via another bus to the processing system. For example, the secondary bus bridge may be an universal serial port (USB) controller used to couple USB devices 2017 via to the processing system 2000. The multimedia processor 2018 may be a sound card, a video capture card, or any other type of media interface, which may also be coupled to one additional device such as speakers 2019. The legacy device interface 2020 is used to couple legacy devices, for example, older styled keyboards and mice, to the processing system 2000.

The processing system 2000 illustrated in FIG. 8 is only an exemplary processing system with which the invention may be used. While FIG. 8 illustrates a processing architecture especially suitable for a general purpose computer, such as a personal computer or a workstation, it should be recognized that well known modifications can be made to configure the processing system 2000 to become more suitable for use in a variety of applications. For example, many electronic devices which require processing may be implemented using a simpler architecture which relies on a CPU 2001 coupled to memory components 2008 and/or memory devices 2009. The modifications may include, for example, elimination of unnecessary components, addition of specialized devices or circuits, and/or integration of a plurality of devices.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A pixel circuit, comprising:
   a photoconversion device for accumulating charge during a first integration period and second integration period, said device being connected to an integration node;
   a first transistor, having one terminal connected to said integration node and another terminal connected to a reset line; and
   a feed-through pulse capacitor, having one terminal coupled to a feed-through pulse signal line, and a second terminal coupled to said integration node, said feed-through pulse signal line providing an intermediate pulse between said first and second integration periods to generate an overflow current in said first transistor during medium and high illumination conditions.

2. The pixel circuit of claim 1, further comprising an output circuit, connected to said integration node, for reading out a signal at said integration node.

3. The pixel circuit of claim 2, wherein said output circuit further comprises a second transistor operating as a source-follower readout transistor.

4. The pixel circuit of claim 1, wherein said photoconversion device is a photodiode.

5. The pixel circuit of claim 4, wherein the first transistor has a gate coupled to a supply voltage.

6. The pixel circuit of claim 5, wherein said reset signal line and said feed-through pulse line are operable to apply a reset voltage to said integration node.

7. The pixel circuit of claim 6, further comprising an output circuit to read out said reset voltage to an output line.

8. The pixel circuit of claim 7, wherein a pixel select line coupled to the integration node, is operable to begin a first charge integration period.

9. The pixel circuit of claim 8, wherein said pixel select line is operable to begin a second charge integration period following said first integration period.

10. A CMOS imaging device, comprising:
    at least one pixel circuit;
    a sample and hold circuit for storing a reset signal and an image signal produced by said pixel circuit;
    an amplifier for subtracting the reset signal from the image signal;
    a digitizer for receiving the output of said amplifier; and
    an image processor for receiving the output of said digitizer, wherein said pixel circuit further comprises:
       a photoconversion device for accumulating charge during a first integration period and second integration period, said device being connected to an integration node;
       a first transistor, having one terminal connected to said integration node and another terminal connected to a reset line; and
       a feed-through pulse capacitor, having one terminal coupled to a feed-through pulse signal line, and a second terminal coupled to said integration node, said feed-through pulse signal line providing an intermediate pulse between said first and second integration periods to generate an overflow current in said first transistor during medium and high illumination conditions.

11. The imaging device of claim 10, further comprising an output circuit, connected to said integration node, for reading out a signal at said integration node.

12. The imaging device of claim 11, wherein said output circuit further comprises a second transistor operating as a source-follower readout transistor.

13. The imaging device of claim 10, wherein said photoconversion device is a photodiode.

14. The imaging device of claim 13, wherein said first transistor has a gate coupled to a supply voltage.

15. The imaging device of claim 14, wherein said reset signal line and said feed-through pulse line are operable to apply a reset voltage to said integration node.

16. The imaging device of claim 15, further comprising an output circuit to read out said reset voltage to an output line.

17. The imaging device of claim 16, wherein a pixel select line coupled to the integration node, is operable to begin a first charge integration period.

18. The imaging device of claim 17, wherein said pixel select line is operable to begin a second charge integration period following said first integration period.

19. A method of operating a pixel circuit, comprising:
    collecting photogenerated charge at an integration node in response to a first pixel signal during a first part of a charge integration period;
    draining photogenerated charge from said integration node to a reset node through a first transistor at the conclusion of the first part of the integration period;
    collecting photogenerated charge at the integration node in response to a second pixel signal during a second part of the charge integration period; and
    injecting an intermediate pulse between said first and second integration periods to generate an overflow current in said first transistor during medium and high illumination conditions.

20. The method of claim 19, wherein the first part of the integration period produces a first linear photoconversion response in the pixel circuit, and the second part of the integration period produces a second linear photoconversion response in the pixel circuit.

21. The method of claim 19, wherein the step of draining photogenerated charge from said integration node to the reset node at the conclusion of the first part of the integration period occurs through the activation of a bias transistor.

22. The method of claim 19, further comprising injecting a feed-through pulse to the integration node at the end of the first part of the integration period to initiate the draining of photogenerated charge.

23. A method of operating a CMOS imaging device, said method comprising the steps of:
    (a) sequentially selecting a row or column of a pixel array;
    (b) starting a first integration period for collecting photogenerated charge from an integration node for each row or column;
    (c) transmitting a feed-through pulse at an intermediate level to the integration node of said imaging device during each row or column horizontal blanking period to end the first integration period and to generate an overflow current in a transistor connected to the integration node during medium and high illumination conditions;

(d) reading out the photo-generated charge;

(e) activating an additional integration period for collecting photo-generated charge from the integration node for each row or column after the photo-generated charge is read out; and (f) repeating steps (a)–(e) sequentially for each row or column line.

24. The method of claim 23, wherein the first integration period and the additional integration time period are of the same length.

25. The method of claim 23, wherein step (f) repeats for every row or column cycle.

26. A processing system, comprising:
a processor; and a CMOS imaging device, coupled to said processor, said imaging device comprising:
   a photoconversion device for accumulating charge during a first integration period and second integration period, said device being connected to an integration node;
   a first transistor, having one terminal connected to said integration node and another terminal connected to a reset line; and
   a feed-through pulse capacitor, having one terminal coupled to a feed-through pulse signal line, and a second terminal coupled to said integration node, said feed-through pulse signal line providing an intermediate pulse between said first and second integration periods to generate an overflow current in said first transistor during medium and high illumination conditions.

27. The processing system of claim 26, further comprising an output circuit, connected to said integration node, for reading out a signal at said integration node.

28. The processing system of claim 27, wherein said output circuit further comprises a second transistor operating as a source-follower readout transistor.

29. The processing system of claim 26, wherein said photoconversion device is a photodiode.

30. The processing system of claim 29, wherein the first transistor has a gate coupled to a supply voltage.

31. The processing system of claim 30, wherein said reset signal line and said feed-through pulse line are operable to apply a reset voltage to said integration node.

32. The processing system of claim 31, further comprising an output circuit to read out said reset voltage to an output line.

33. The processing system of claim 32, wherein a pixel select line is coupled to the integration node and is operable to begin a first charge integration period.

34. The processing system of claim 33, wherein said pixel select line is operable to begin a second charge integration period following said first integration period.

* * * * *

UNITED STATES PATENT AND TRADEMARK OFFICE
CERTIFICATE OF CORRECTION

PATENT NO. : 7,224,388 B2  Page 1 of 1
APPLICATION NO. : 10/431397
DATED : May 29, 2007
INVENTOR(S) : Isao Takayanagi It is certified that error appears in the above-identified patent and that said Letters Patent is hereby corrected as shown below:

In the Specification, the following errors are corrected:

Column 6, line 24, "an shut-off" should read --a shut-off--;

Column 9, line 59, "followed" should read --follower--;

Column 14, line 17, "include" should read --includes--;

Column 14, line 43, "an local" should read --a local--;

Column 14, line 47, "an universal" should read --a universal--; and

Column 14, line 48, "via to the" should read --via the--.

Signed and Sealed this

Seventh Day of August, 2007

JON W. DUDAS
*Director of the United States Patent and Trademark Office*